Jan. 25, 1955   R. A. BENTLEY   2,700,414
ADJUSTABLE ARMREST
Filed April 17, 1953
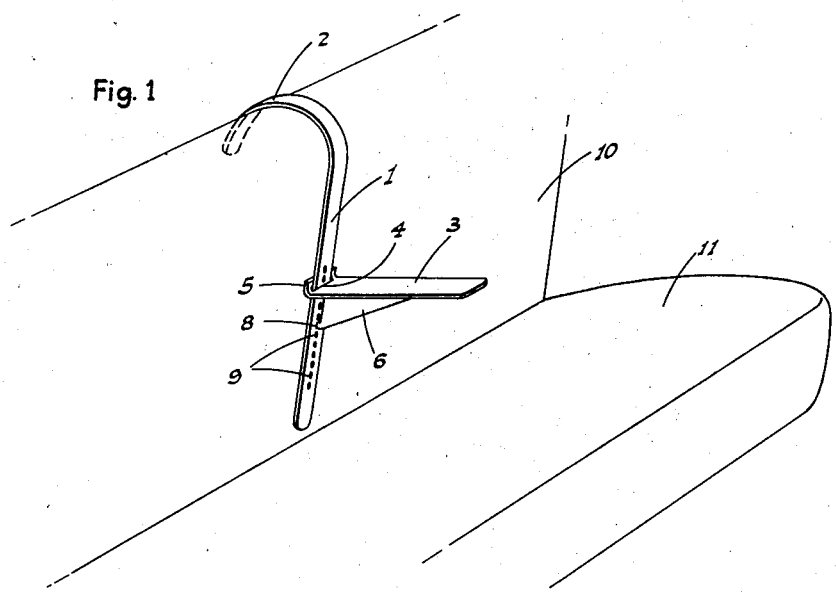
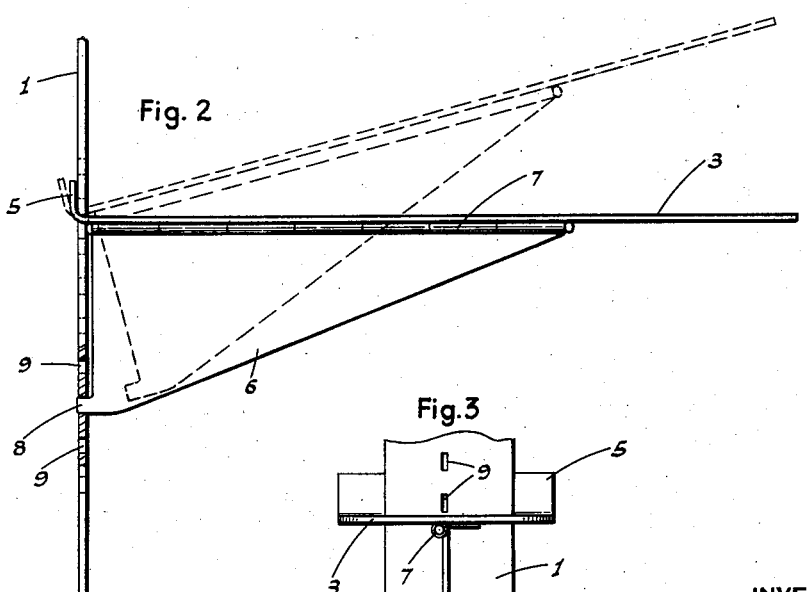
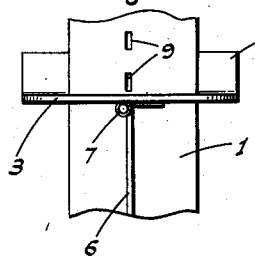
INVENTOR
Robert A. Bentley
BY
ATTYS

2,700,414

ADJUSTABLE ARMREST

Robert A. Bentley, Wheatland, Calif.

Application April 17, 1953, Serial No. 349,495

3 Claims. (Cl. 155—112)

This invention relates generally to an automotive accessory.

In particular, the invention is directed to, and it is a major object to provide, a novel arm rest adapted for attachment to the back rest of an automobile seat in a central position; i. e. between the occupants of the seat.

Another important object of the invention is to provide an arm rest which is readily attachable to or removable from the back rest of an automobile seat.

An additional object of the invention is to provide an arm rest, of the type described, which is readily manually vertically adjustable to the most convenient position for the person using the arm rest.

A further object of the invention is to provide an arm rest, as above, which can be readily disassembled and folded for storage when not in use.

It is also an object of the invention to provide an arm rest, for use in automobiles, which is designed for ease and economy of manufacture, and convenience of attachment to the back rest of an automobile seat.

Still another important object of the invention is to provide a practical and reliable adjustable arm rest, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the arm rest as in use.

Fig. 2 is an enlarged fragmentary side elevation of the arm rest; the arm rest shelf and the supporting plate being shown in their normal positions in full lines, and shown in dotted lines in the positions occupied thereby for vertical adjustment.

Fig. 3 is an enlarged fragmentary outer end elevation of the arm rest.

Referring now more particularly to the characters of reference on the drawings, the arm rest comprises a forwardly facing, flat, rigid, upstanding bar 1 formed at its upper end, in integral relation, with a rearwardly projecting, downwardly opening hook 2 of substantially semicircular configuration.

An arm rest 3 projects forwardly from the bar 1 intermediate its ends; such arm rest 3 being a flat, upwardly facing, elongated shelf of somewhat greater width than said bar 1.

Adjacent, but short of, its inner end the arm rest 3 is formed with a transverse slot 4 through which the bar 1 projects in loose fitting and relatively slidable relation.

Rearwardly of the transverse slot 4 the arm rest 3 is formed with an upturned transverse flange 5 which normally lies in abutment against the back side of the bar 1.

A normally vertically disposed, but elongated gusset-like supporting plate 6 extends from closely adjacent the bar 1 forwardly beneath the arm rest 3, terminating short of the outer end of the latter.

At its upper longitudinal edge the gusset-like supporting plate 6 is secured to the under side of the arm rest 3 by a full length, piano type hinge 7.

At the lower rear corner thereof the supporting plate 6 is formed with an integral, relatively short, rearwardly projecting tongue 8 which engages selectively in one of a row of vertically spaced holes 9 formed in the bar 1 intermediate the ends thereof.

In the normal operative position of the device the arm rest 3 is effectively supported from the bar 1 by the foregoing arrangement; the upturned transverse flange 5 abutting the back side of the bar 1, while the tongue 8 seats firmly in one of the holes 9.

When the arm rest is in use the upstanding bar 1 is disposed against the forward portion of the back rest 10 of an automobile seat 11; the hook 2 engaging over the upper edge portion of said back rest.

The arm rest 3 is attached to the back rest 10, as above, at a substantially central point, whereby—when used in connection with the front seat of an automobile—to provide a support or rest for the right arm of the driver, or the left arm of the front seat passenger. This enhances the comfort of the driver or passenger, and particularly affords to the driver the opportunity of resting the right arm, and which otherwise becomes tired, especially on long drives.

In manufacture it is contemplated that the arm rest 3 will be suitably padded or upholstered.

When it is desired to adjust the arm rest 3 either up or down, it is merely tilted upward from the horizontal position shown in full lines to the inclined position shown in dotted lines in Fig. 1. In such latter position the tongue 8 escapes the engaged hole 9, whereupon the arm rest 3 can be slid up or down the bar 1 to a selected position of adjustment; the arm rest then being returned to its horizontal position, with the tongue 8 engaged in the nearest hole 9.

While the device is especially adapted for front seat use alongside the driver of an automobile, such device can be used effectively in connection with the rear seat.

When the device is not in use it may be removed from the back rest 10 by the simple expedient of pulling upwardly on the bar 1, causing escape of the hook 2. Thereafter, by releasing the tongue 8 from the engaged hole 9, the arm rest 3 can be slid off of the bar 1, and next the supporting plate 6 is hinged down flat relative to said arm rest, whereby these parts may then be stored with the bar 1 so as to occupy a minimum of space, as in the trunk of the automobile.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A removable arm rest for the back rest of an automobile seat, comprising an upstanding bar adapted to be supported against the front side of the back rest, an arm-rest shelf projecting forwardly from the bar intermediate its ends, the shelf having a slot therethrough adjacent its rear end, the bar extending in relatively slidable relation through the slot, a vertically disposed supporting plate extending longitudinally beneath the arm-rest shelf, means securing the plate along its upper edge to the under side of the arm-rest shelf, and a tongue projecting rearwardly from the rear edge of the plate adjacent its lower edge, the bar having a row of vertically spaced holes therein each adapted for reception of said tongue.

2. A device as in claim 1, in which the plate is hinged along its upper edge on the shelf for upward folding in a lateral direction.

3. A device as in claim 1, in which the shelf terminates in an upturned transverse flange at the back end of the slot to normally abut against the back side of the bar.

References Cited in the file of this patent

UNITED STATES PATENTS

| | | |
|---|---|---|
| 744,149 | Wilton | Nov. 17, 1903 |
| 1,463,293 | Paddock | July 31, 1923 |
| 2,184,181 | Fall | Dec. 19, 1939 |
| 2,256,944 | Fall | Sept. 23, 1941 |
| 2,530,384 | Faggen | Nov. 21, 1950 |
| 2,560,791 | Fincher et al. | July 17, 1951 |
| 2,569,834 | Smith | Oct. 2, 1951 |
| 2,584,732 | Okim | Feb. 5, 1952 |
| 2,627,115 | Pippin | Feb. 3, 1953 |

FOREIGN PATENTS

| | | |
|---|---|---|
| 264,293 | Great Britain | Jan. 20, 1927 |